(12) United States Patent
Hirota et al.

(10) Patent No.: US 11,649,885 B2
(45) Date of Patent: May 16, 2023

(54) DIFFERENTIAL APPARATUS (71) Applicant: GKN Automotive Limited, Birmingham (GB)

(72) Inventors: Isao Hirota, Tochigi (JP); Noboru Higano, Tochigi (JP); Yousuke Kawai, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/567,922

(22) Filed: Jan. 4, 2022

(65) Prior Publication Data
US 2022/0213952 A1 Jul. 7, 2022

(30) Foreign Application Priority Data
Jan. 7, 2021 (JP) .............................. JP2021-001353

(51) Int. Cl.
*F16H 48/40* (2012.01)
*F16H 48/08* (2006.01)
*F16H 48/22* (2006.01)
*F16H 48/38* (2012.01)

(52) U.S. Cl.
CPC ............. *F16H 48/40* (2013.01); *F16H 48/08* (2013.01); *F16H 48/22* (2013.01); *F16H 2048/385* (2013.01)

(58) Field of Classification Search
CPC .... F16H 48/22; F16H 48/40; F16H 2048/385; F16H 2048/405
See application file for complete search history.

(56) References Cited

U.S. PATENT DOCUMENTS

| | | | | |
|---|---|---|---|---|
| 2,037,961 A | * | 4/1936 | Boden | F16C 19/54 384/571 |
| 5,911,643 A | * | 6/1999 | Godlew | F16H 48/08 475/150 |
| 9,752,668 B2 | * | 9/2017 | Okazaki | F16H 48/22 |
| 2010/0062892 A1 | * | 3/2010 | Vogel | F16H 48/08 475/230 |

FOREIGN PATENT DOCUMENTS

| | | | | |
|---|---|---|---|---|
| JP | H1182678 A | * | 3/1999 | ............ F16H 48/08 |
| JP | 2013072473 A | | 4/2013 | |
| WO | WO-2017042882 A1 | * | 3/2017 | |

* cited by examiner

*Primary Examiner* — Ernesto A Suarez
*Assistant Examiner* — James J Taylor, II
(74) *Attorney, Agent, or Firm* — Bejin Bieneman PLC (57) ABSTRACT

A differential apparatus includes a differential unit and a multi-plate clutch. The differential unit includes a differential case, a differential gear and a pair of output gears. The differential case includes a case main body and a cover body to close an opening of the case main body. The opening of the case main body is formed on a side of one of the pair of output gears. The multi-plate clutch is provided only on a side of the opening of the case main body. Outer clutch plates of the multi-plate clutch are engaged with the differential case. Inner clutch plates of the multi-plate clutch are engaged with the one of the pair of the output gears.

6 Claims, 8 Drawing Sheets

DIFFERENTIAL APPARATUS

CROSS-REFERENCE TO RELATED APPLICATIONS

This application is based on, and under 35 USC 119 claims priority from, Japanese Patent Application No. 2021-001353 filed on Jan. 7, 2021, the contents of which are incorporated herein by reference in their entirety.

BACKGROUND

JP2013072473A discloses a differential apparatus including a differential unit and a multi-plate clutch. The differential unit includes a differential case that receives a driving force and that is rotatably provided, a differential gear that is supported on the differential case, that is rotatable on an axis of the differential gear, and that rotates by rotation of the differential case on an axis of the differential case, and a pair of output gears that respectively mesh with the differential gear and are rotatable relative to each other, and that are capable of outputting a driving force. The multi-plate clutch includes a plurality of outer clutch plates and inner clutch plates movable in an axial direction and limits differential movement of the differential unit.

In the differential apparatus, the differential case includes a case main body in which an opening is formed on a side of one of the pair of the output gears, and a cover body that closes the opening of the case main body. A flange portion allowing a driving force to be input to the differential case is formed on the cover body.

In the differential apparatus, the multi-plate clutch is provided on each side of the pair of output gears. The outer clutch plates are engaged with the differential case so as to be integrally rotatable with the differential case, and the inner clutch plates are engaged with the pair of output gears so as to be integrally rotatable with the pair of output gears.

In the differential apparatus of JP2013072473A, because the multi-plate clutch is provided on each side of the pair of output gears, the number of components is increased. The multi-plate clutch is also provided on a side of the other of the pair of output gears that is a back side of the case main body. Therefore, it is necessary to access an area where the multi-plate clutch is engaged on the back side of the case main body using a special tool from an opening side of the case main body, and the manufacturing cost is increased.

SUMMARY

The present disclosure relates to a differential apparatus capable of reducing a number of components and reducing costs.

In accordance with embodiments, a differential apparatus includes a differential unit and a multi-plate clutch. The differential unit includes a differential case, a differential gear and a pair of output gears. The multi-plate clutch includes a plurality of outer clutch plates and a plurality of inner clutch plates and configured to limit differential movement of the differential unit. The plurality of outer clutch plates and the plurality of inner clutch plates are movable in an axial direction. The differential case is rotatably provided and configured to receive a driving force. The differential gear is supported on the differential case so as to be rotatable on an axis of the differential gear and is rotatable on an axis of the differential case. The pair of output gears are rotatable relative to each other. The pair of output gears respectively mesh with the differential gear and are respectively capable of outputting a driving force. The differential case includes a case main body and a cover body formed to close an opening of the case main body. The opening of the case main body is formed on a side of one of the pair of output gears. The cover body includes a flange portion, a driving force being input to the differential case through the flange portion. The multi-plate clutch is provided only on a side of the opening of the case main body. The outer clutch plates are engaged with the differential case so that the outer clutch plates are integrally rotatable with the differential case. The inner clutch plates are engaged with the one of the pair of the output gears so that the inner clutch plates are integrally rotatable with the one of the pair of the output gears.

DESCRIPTION OF EXAMPLE EMBODIMENTS

A differential apparatus will be described with reference to FIGS. 1 to 8.

First Embodiment

A first embodiment will be described with reference to FIGS. 1 to 7.

Figure 1:
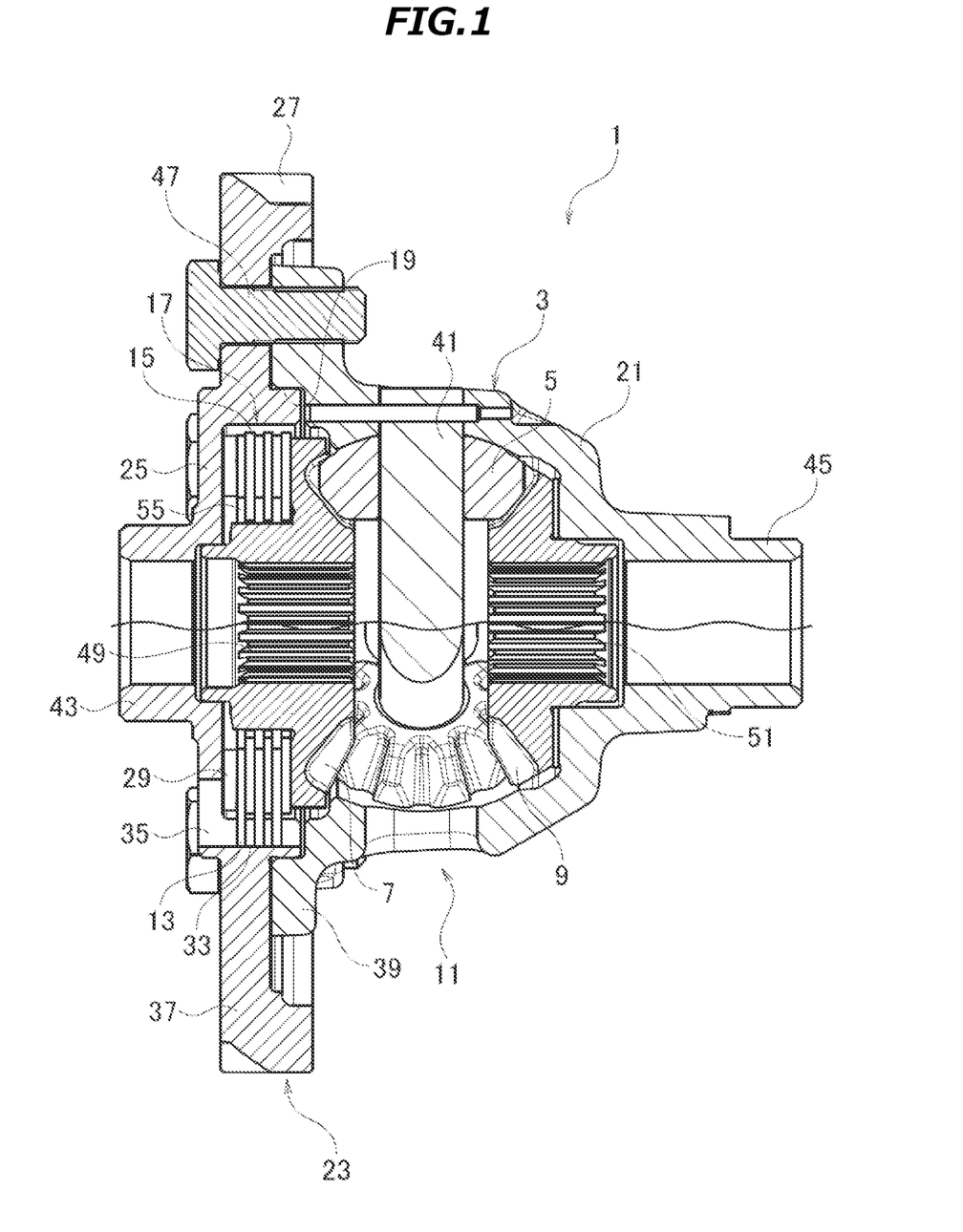
FIG. 1 is a cross-sectional view showing a differential apparatus according to a first embodiment.
Figure 2:
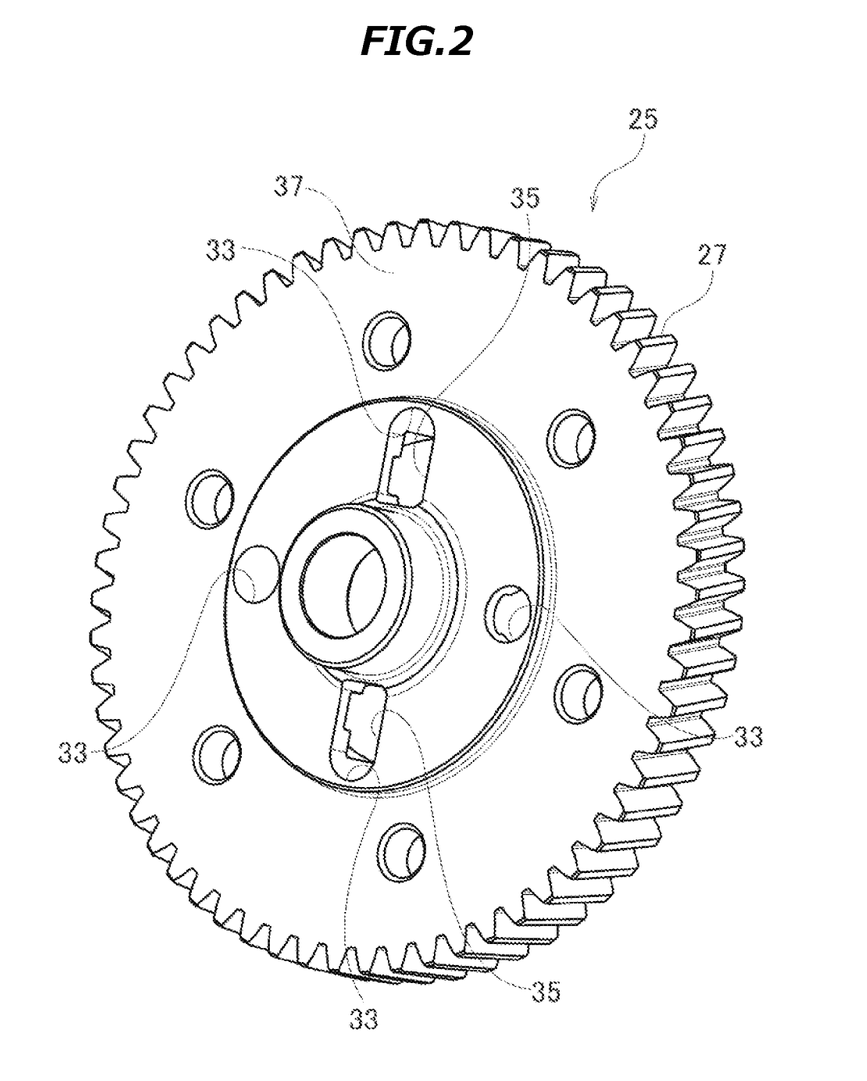
FIG. 2 is a perspective view showing a cover body of the differential apparatus according to the first embodiment.
Figure 3:
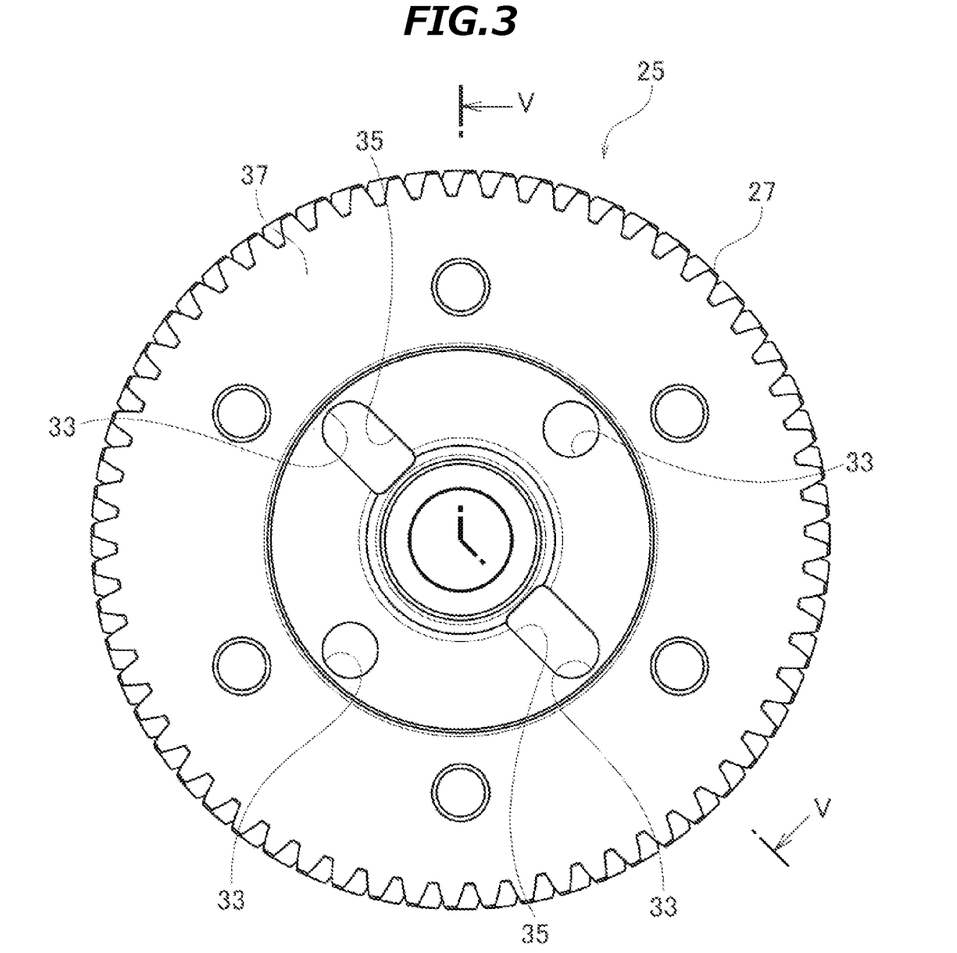
FIG. 3 is a plan view showing the cover body of the differential apparatus according to the first embodiment as viewed from one side in an axial direction.
Figure 4:
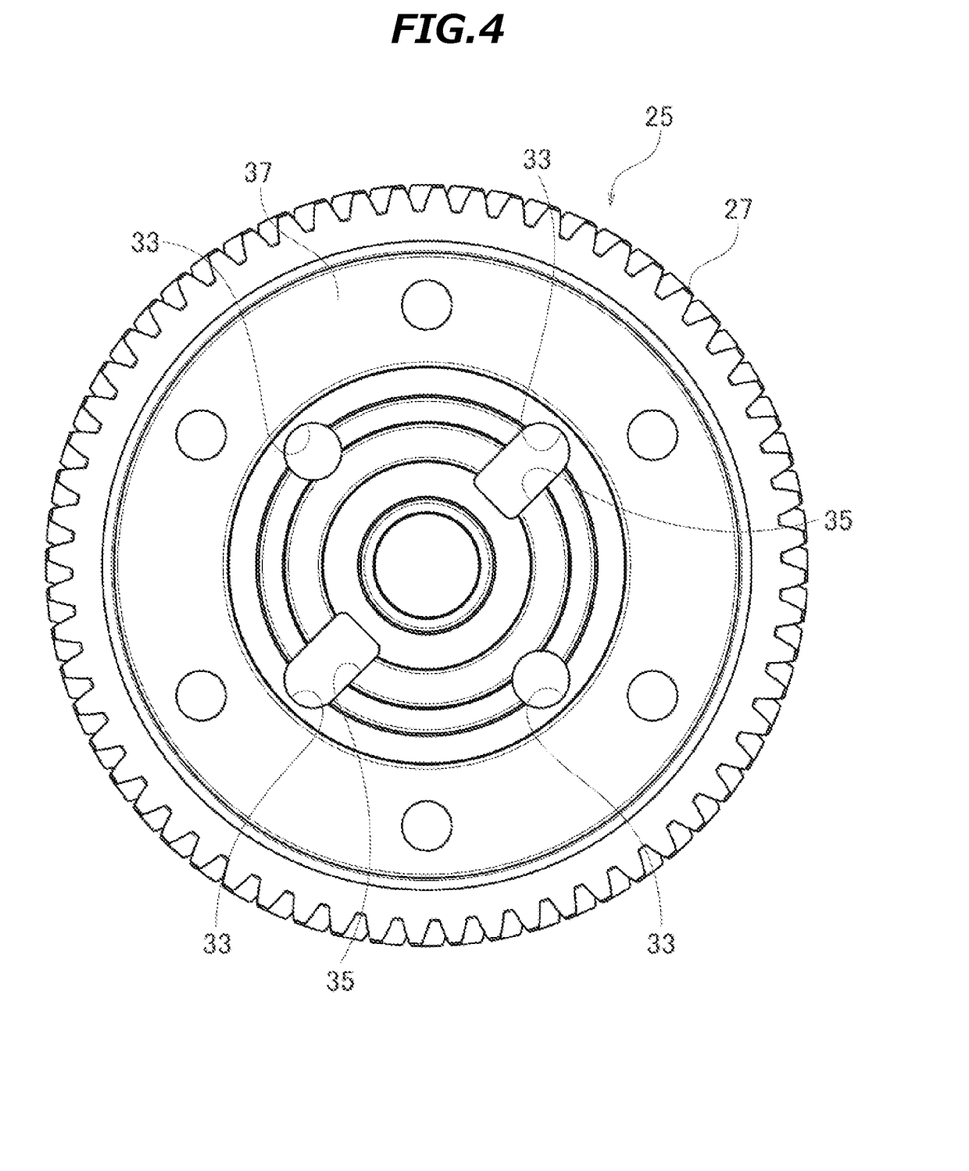
FIG. 4 is a plan view showing the cover body of the differential apparatus according to the first embodiment as viewed from the other side in the axial direction.
Figure 5:
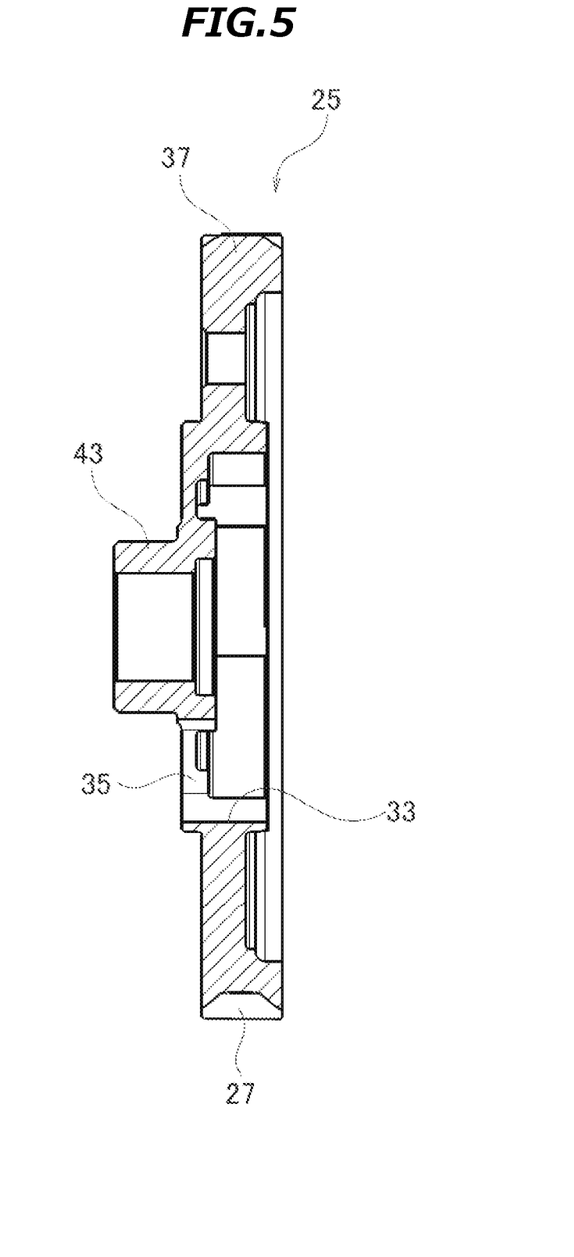
FIG. 5 is a cross-sectional view taken along a line V-V in FIG. 3.

A differential apparatus 1 includes a differential unit 11 and a multi-plate clutch 17. The differential unit 11 includes a differential case 3, a differential gear 5, and a pair of output gears 7, 9. The differential case 3 receives a driving force and is rotatable. The differential gear 5 is supported on the differential case 3. The differential gear 5 is rotatable on an axis of the differential gear 5, and is rotatable by rotation of the differential case 3. The pair of output gears 7, 9 respectively mesh with the differential gear 5. The pair of output gears 7, 9 are rotatable relative to each other, and are capable of outputting a driving force. The multi-plate clutch 17 that includes a plurality of outer clutch plates 13 and inner clutch plates 15 movable in an axial direction. The multi-plate clutch 17 limits differential movement of the differential unit 11.

The differential case 3 includes a case main body 21 and a cover body 25. In the case main body 21, an opening 19 is formed on a side of the output gear 7 of the pair of output gears 7, 9. The cover body 25 closes the opening 19 of the case main body 21. A flange portion 23 allowing a driving force to be input to the differential case 3 is formed in the cover body 25.

The multi-plate clutch 17 is provided only on a side of the opening 19. The outer clutch plates 13 are engaged with the differential case 3 so as to be integrally rotatable with the differential case 3. The inner clutch plates 15 are engaged with the output gear 7 so as to be rotatable with the differential case 3.

The flange portion 23 is integrally formed with a gear portion 27 that allows a driving force to be input to the differential case 3.

The multi-plate clutch 17 is provided on an inner diameter side of the gear portion 27. At least a part of the multi-plate clutch 17 in the axial direction and at least a part of the gear portion 27 in the axial direction overlap with each other in a radial direction.

The outer clutch plate 13 is engaged with the cover body 25 so as to be integrally rotatable with the cover body 25.

At least a part of the multi-plate clutch 17 in the axial direction and at least a part of the flange portion 23 in the axial direction overlap with each other in the radial direction.

A biasing member 29 that applies a preload to the multi-plate clutch 17 is provided between the differential case 3 and the multi-plate clutch 17 in the axial direction. The output gear 7 receives a pressing force to the multi-plate clutch 17 generated by the biasing member 29.

The differential case 3 is formed with an engagement recess 33 and a release groove 35. A plurality of outer peripheral protrusions 31 formed on the outer clutch plate 13 in a circumferential direction is engaged by the engagement recess 33. The release groove 35 faces a bearing in an axial direction. The bearing rotatably supports the differential case 3 with respect to a stationary system. The release groove 25 allows the bearing to be detached from the differential case 3. The engagement recess 33 communicates with the release groove 35.

A second flange portion 39 is formed on an outer peripheral portion of the case main body 21 on the side of the opening 19, with the flange portion 23 of the cover body 25 serving as a first flange portion 37. The second flange portion 39 abuts against the first flange portion 37 in the axial direction and is integrally fixed to the first flange portion 37. At least a part of the second flange portion 39 in the axial direction overlaps with the gear portion 27 and the multi-plate clutch 17 in the radial direction.

As shown in FIGS. 1 to 7, the differential apparatus 1 includes the differential unit 11 and the multi-plate clutch 17.

The differential unit 11 includes the differential case 3, a pinion shaft 41, the differential gears 5, and the pair of output gears 7, 9.

The differential case 3 includes the case main body 21 in which an opening 19 is formed, and the cover body 25 capable of closing the opening 19. The differential case 3 is rotatably supported on the stationary system (not shown) such as a carrier via bearings (not shown) on outer peripheries of boss portions 43, 45 provided on both sides in the axial direction.

The differential case 3 is provided with the flange portion 23 that allows the driving force from a drive source to be input. The flange portion 23 includes the first flange portion 37 formed on an outer peripheral portion of the cover body 25 and the second flange portion 39 formed on the outer peripheral portion of the case main body 21 on the side of the opening 19.

In the flange portion 23, in a state in which the cover body 25 closes the opening 19 of the case main body 21, the first flange portion 37 and the second flange portion 39 abut against each other in the axial direction, and the flange portion 23 is fixed via bolts 47 at a plurality of positions (here, six positions) in the circumferential direction.

On an outer periphery of the first flange portion 37 serving as the flange portion 23, the gear portion 27 is formed as an integral member continuous with the cover body 25. The gear portion 27 meshes with a transmission gear (not shown) connected to an input-side mechanism (not shown) to which the driving force is transmitted from the drive source, and the driving force from the drive source is transmitted to the differential case 3.

By forming the gear portion 27 integrally with the flange portion 23, the number of components can be reduced.

The pinion shaft 41, the differential gears 5, and the pair of output gears 7, 9 are accommodated in the differential case 3, and the driving force input to the differential case 3 is transmitted.

Both end portions of the pinion shaft 41 are engaged with hole portions formed in the differential case 3. One end of the pinion shaft 41 is prevented from coming off and rotating by a pin. The pinion shaft 41 is rotationally driven integrally with the differential case 3. The differential gears 5 are each supported on a respective one of both end sides of the pinion shaft 41.

A plurality of (here, two) differential gears 5 are provided at an equal interval in the circumferential direction of the differential case 3. Each differential gear 5 is supported on an end portion side of the pinion shaft 41 and rotates by the rotation of the differential case 3.

The differential gear 5 is rotatably supported on the pinion shaft 41 such that the differential gear 5 is rotationally driven when differential rotation occurs between the pair of output gears 7, 9 meshing with each other. This differential gear 5 transmits the driving force input to the differential case 3 to the pair of output gears 7, 9.

The pair of output gears 7, 9 are rotatably supported on the differential case 3 at boss portions formed on the output gears 7, 9, respectively, and mesh with the differential gear 5. The pair of output gears 7, 9 are rotatable relatively with each other. The pair of output gears 7, 9 are provided with spline-shaped coupling portions 49, 51 on inner peripheral sides of the output gears 7, 9, respectively.

Drive shafts (not shown) connected to output-side mechanisms (not shown) are coupled to the output gears 7, 9 at the coupling portions 49, 51 of the pair of output gears 7, 9, so as to be integrally rotatable with the output gears 7, 9 and output the driving force input to the differential case 3 to the output-side mechanisms.

The differential movement of the differential unit 11 is limited by the multi-plate clutch 17.

The multi-plate clutch 17 is provided only on the opening 19 side of the case main body 21 that is the side of the output gear 7. The multi-plate clutch 17 includes a plurality of outer clutch plates 13 and a plurality of inner clutch plates 15.

Figure 6:
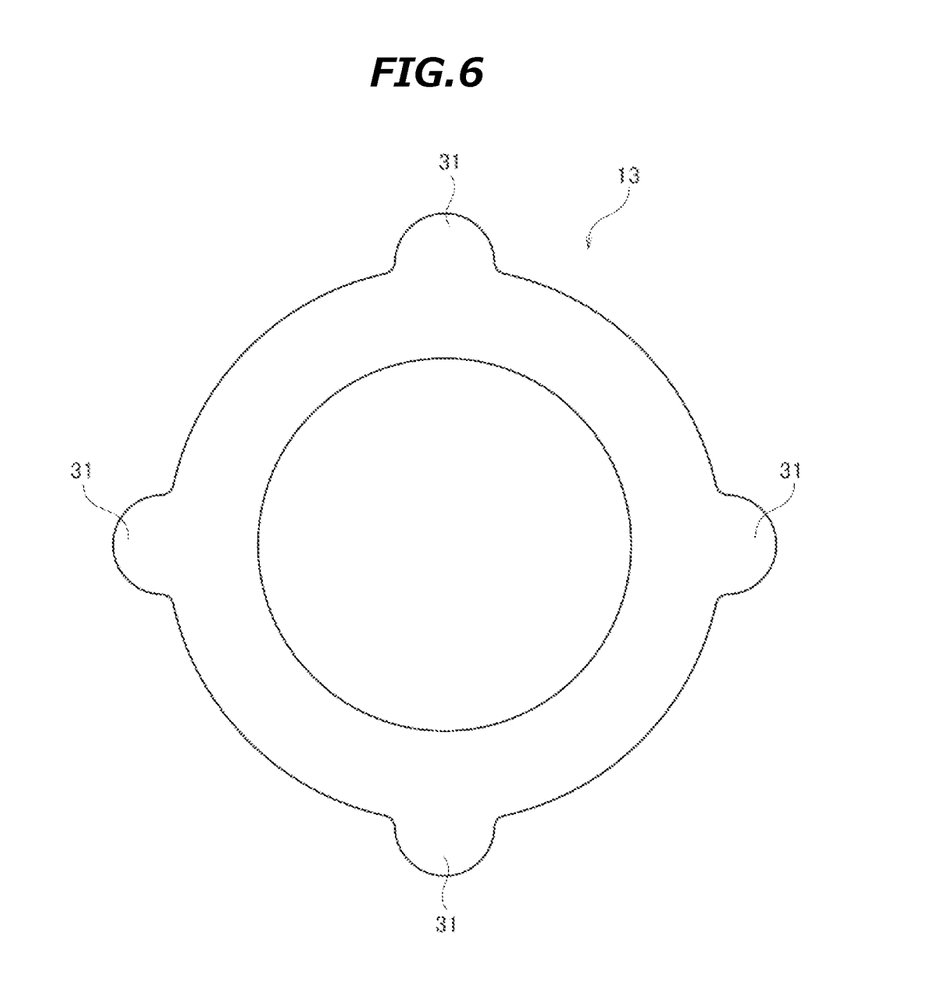
FIG. 6 is a plan view showing an outer clutch plate of the differential apparatus according to the first embodiment.

Each of the plurality of outer clutch plates 13 is formed in an annular shape, and a plurality of (in the present example, four) outer peripheral protrusions 31 protruding outward at an outer periphery in the radial direction are formed at equal intervals in the circumferential direction. The plurality of outer clutch plates 13 are movable in the axial direction and integrally rotatable with the differential case 3 by engaging the outer peripheral protrusions 31 with a plurality of (here, four) engagement recesses 33 formed in the cover body 25 of the differential case 3.

Figure 7:
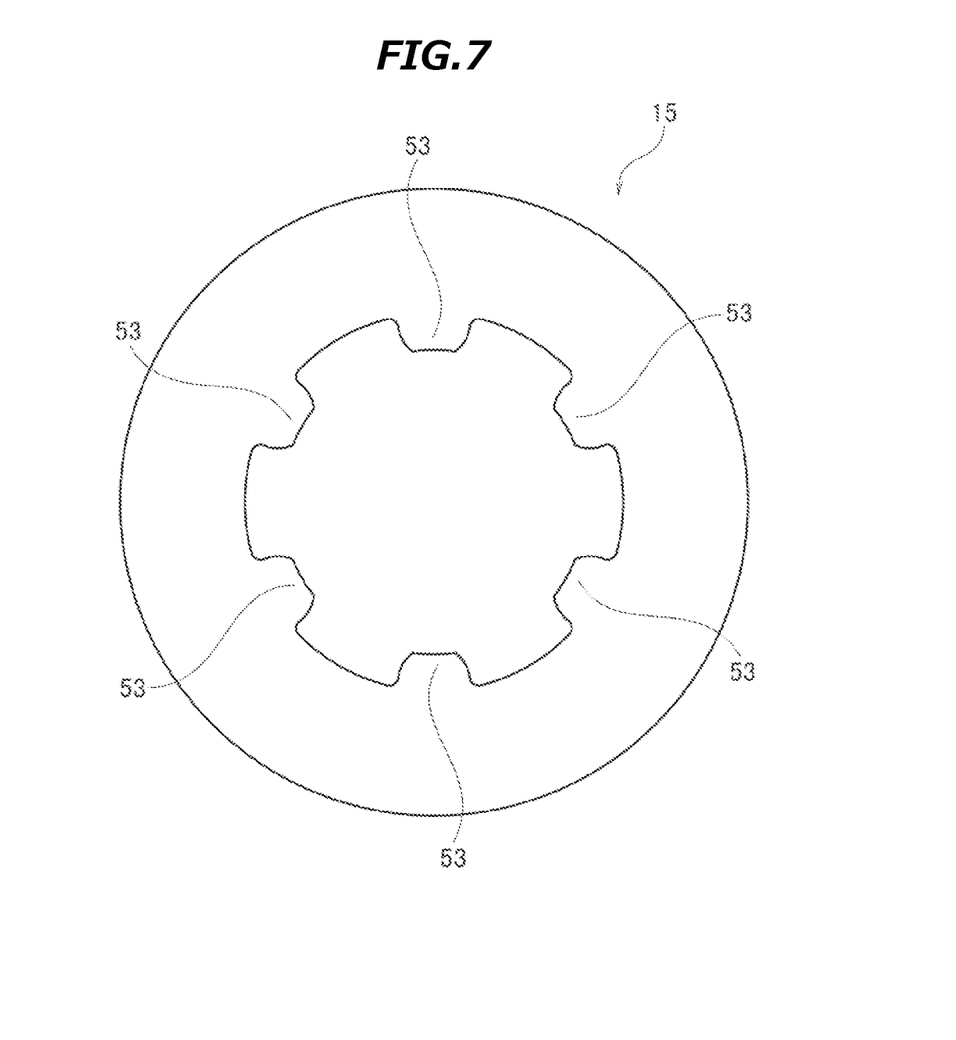
FIG. 7 is a plan view showing an inner clutch plate of the differential apparatus according to the first embodiment.

Each of the plurality of inner clutch plates 15 is formed in an annular shape, and a plurality of (in the present example, six) inner peripheral protrusions 53 protruding inward at an inner periphery in the radial direction are formed at equal intervals in the circumferential direction. The plurality of inner clutch plates 15 are alternately arranged with respect to the plurality of outer clutch plates 13 in the axial direction, and are movable in the axial direction and integrally rotatable with the output gear 7 by engaging the inner peripheral protrusions 53 with a plurality of (in the present example, six) engagement recesses 55 formed in the boss portion of the output gear 7.

The multi-plate clutch 17 is a friction clutch that is pressed and coupled by the output gear 7 that is moved outward in the axial direction by a meshing reaction force with the differential gear 5 when differential rotation occurs between the pair of output gears 7, 9. By the connection of the multi-plate clutch 17, it is possible to limit the differential movement in the differential unit 11.

A vehicle to which the differential apparatus having a differential limiting function is applied is, for example, a golf cart. The golf cart is stopped in a state in which the transmission of the driving force from the drive source to the differential unit 11 is blocked. The golf cart may be stopped on an inclined surface.

In a vehicle that may be stopped on the inclined surface in this way, it is assumed that the vehicle is stopped on the inclined surface when the differential apparatus does not have the differential limiting function. At this time, if rotation occurs in one of left and right wheels, the differential unit 11 allows differential rotation between the pair of output gears 7, 9 even though the other wheel stops, and the vehicle may move.

On the other hand, as in the differential apparatus 1, in a case in which the differential apparatus 1 has a differential limiting function such as the multi-plate clutch 17, even if the vehicle is stopped on the inclined surface and rotation occurs in one of the wheels, the differential movement in the differential unit 11 is limited, and a stopped state of the vehicle can be maintained.

When the stopped state of the vehicle is maintained in this way, a sufficient differential limiting function for the differential unit 11 can be attained even if the multi-plate clutch 17 is not provided on each of the pair of output gears 7, 9.

Therefore, in the differential apparatus 1, the multi-plate clutch 17 is provided only on the opening 19 side (i.e., the side of the output gear 7 among the pair of the output gears 7, 9) of the case main body 21 of the differential case 3. Using one multi-plate clutch 17 in this way, a structure can be simplified, and the number of components can be reduced.

In addition, using a configuration in which the output gear 7 presses the multi-plate clutch 17, the number of components such as a pressing member that presses the multi-plate clutch 17 can be reduced, and the structure can be further simplified.

A preload is applied to the multi-plate clutch 17 by the biasing member 29. The biasing member 29 is implemented by a disc spring, is provided between the cover body 25 of the differential case 3 and the outer clutch plate 13 of the multi-plate clutch 17 in the axial direction, and presses the multi-plate clutch 17 toward the side of the output gear 7 in the axial direction.

By applying the preload to the multi-plate clutch 17 by the biasing member 29 in this way, an initial operation of the multi-plate clutch 17 can be improved, and a differential limiting characteristic can be improved.

Because the biasing member 29 is provided in the axial direction between the differential case 3 and the outer clutch plate 13 that rotates integrally with the differential case 3, the biasing member 29 does not slide. Therefore, it may not be necessary to apply a material having wear resistance or processing to the biasing member 29, and the biasing member 29 can be simplified.

A pressing force of the biasing member 29 is input to a back surface side of the output gear 7. Because the output gear 7 meshes with the differential gear 5, rigidity of the output gear 7 is high. By receiving the pressing force of the biasing member 29 with the output gear 7, it is possible to stably apply a preload to the multi-plate clutch 17 without increasing rigidity of the differential case 3.

The biasing member 29 may be provided between the back surface side of the output gear 7 and the inner clutch plate 15 of the multi-plate clutch 17, and may press the multi-plate clutch 17 toward a cover body 25 side of the differential case 3 in the axial direction.

Even when the biasing member 29 is provided in this way, because the biasing member 29 is provided in the axial direction between the output gear 7 and the inner clutch plate 15 that rotates integrally with the output gear 7, the biasing member 29 does not slide.

The outer peripheral protrusions 31 of the outer clutch plate 13 of the multi-plate clutch 17 are engaged with the engagement recesses 33 formed in an inner periphery of the cover body 25 of the differential case 3. The engagement recesses 33 are formed by holes passing through the cover body 25 in the axial direction, and a plurality of (in the present example, four) engagement recesses 33 are arranged at equal intervals in the circumferential direction.

In this way, by providing the multi-plate clutch 17 on the opening 19 side of the case main body 21 and forming the engagement recesses 33 on the cover body 25, it is not necessary to form the engagement recesses 33 in the case main body 21.

Therefore, it may not be necessary to form the engagement recesses 33 on a back side (the other output gear 9 side) of the case main body 21 using a special tool, and the manufacturing cost of the case main body 21 can be reduced. In addition, by forming the engagement recesses 33 in the cover body 25, a structure of the case main body 21 can be simplified.

Further, by changing only the cover body 25 for the differential apparatus that does not have the differential limiting function such as the multi-plate clutch 17, the case main body 21 can be shared, and versatility of the case main body 21 can be improved.

The multi-plate clutch 17 is provided on the inner diameter side of the gear portion 27, and at least a part of the multi-plate clutch 17 in the axial direction overlaps with the gear portion 27 in the radial direction. In addition, at least a part of the multi-plate clutch 17 in the axial direction overlaps with the flange portion 23 in the radial direction.

By providing the multi-plate clutch 17 in this way, it is possible to reduce a size of an installation space in the axial direction, and it is possible to prevent an increase in a size of the differential apparatus 1 in the axial direction.

In addition, because the gear portion 27 is formed on an outer diameter side of the flange portion 23 and the engagement recesses 33 are formed on an inner diameter side of the flange portion 23, a member strength can be increased between the outer diameter side and the inner diameter side of the flange portion 23, and deformation of the flange portion 23 can be prevented.

Therefore, meshing vibration of the gear portion 27 can be reduced, and sliding stability of the multi-plate clutch 17 can be improved.

In the flange portion 23, the second flange portion 39 of the case main body 21 is provided on the inner diameter side of the gear portion 27 of the first flange portion 37 of the cover body 25, and at least a part of the flange portion 23 in the axial direction overlaps with the gear portion 27 and the multi-plate clutch 17 in the radial direction.

By providing the second flange portion 39 in this way, it is possible to prevent overhanging of the second flange portion 39 in the axial direction and to prevent an increase in the size of the differential apparatus 1 in the axial direction.

Here, the cover body 25 of the differential case 3 is formed with the release groove 35 that is formed by a hole penetrating the cover body 25 in the axial direction, and that faces, in the axial direction, a bearing (not shown) rotatably supporting the differential case 3. A jig (not shown) is inserted into the release groove 35 and abuts against the bearing, so that the bearing can be detached from the differential case 3.

A plurality (here, two) of release grooves 35 are formed at an equal interval in the circumferential direction with respect to the circumferential direction of the cover body 25 of the differential case 3. The plurality of release grooves 35 are formed at positions corresponding to the engagement recesses 33 with respect to the circumferential direction of the cover body 25 of the differential case 3, and communicate with the engagement recesses 33.

By forming the release grooves 35 and the engagement recesses 33 at a position where the release grooves 35 and the engagement recesses 33 communicate with each other in this way, it is possible to reduce a wall thinning portion of the cover body 25, and it is possible to prevent a decrease in the rigidity of the differential case 3 while maintaining rigidity of the cover body 25.

In this differential apparatus 1, the multi-plate clutch 17 is provided only on the opening 19 side. The outer clutch plates 13 are engaged with the differential case 3 so as to be integrally rotatable with the differential case 3, and the inner clutch plates 15 are engaged with the output gear 7 so as to be integrally rotatable with the output gear 7.

Therefore, because the multi-plate clutch 17 is provided only on the opening 19 side of the case main body 21, the number of components can be reduced. Because the multi-plate clutch 17 is not provided on the back side of the case main body 21, it is not necessary to perform processing using a special tool, and the manufacturing cost can be reduced.

Therefore, in the differential apparatus 1, the number of components can be reduced, and the cost can be reduced.

The flange portion 23 is integrally formed with a gear portion 27 that allows a driving force to be input to the differential case 3. Therefore, when the gear portion 27 is formed separately, it is possible to reduce the gear portion 27 itself and a fixing member that fixes and the gear portion 27, and it is possible to reduce the number of components.

The multi-plate clutch 17 is provided on an inner diameter side of the gear portion 27. At least a part of the multi-plate clutch 17 in the axial direction and at least a part of the gear portion 27 in the axial direction overlaps with each other in a radial direction.

Therefore, it is possible to reduce a size of an installation space of the multi-plate clutch 17 and the gear portion 27 in the axial direction, and it is possible to prevent an increase in the size of the differential apparatus 1 in the axial direction.

The outer clutch plate 13 is engaged with the cover body 25 so as to be integrally rotatable with the cover body 25. Therefore, it is not necessary to form a portion where the outer clutch plate 13 is engaged with the case main body 21, and the structure of the case main body 21 can be simplified.

Further, at least a part of the multi-plate clutch 17 in the axial direction and at least a part of the flange portion 23 in the axial direction overlaps with each other in the radial direction. Therefore, it is possible to reduce a size of an installation space of the multi-plate clutch 17 and the flange portion 23 in the axial direction, and it is possible to prevent an increase in the size of the differential apparatus 1 in the axial direction.

The biasing member 29 that applies the preload to the multi-plate clutch 17 is provided between the differential case 3 and the multi-plate clutch 17 in the axial direction. The output gear 7 receives the pressing force to the multi-plate clutch 17 generated by the biasing member 29.

Therefore, the pressing force of the biasing member 29 is received by the output gear 7 whose member strength is increased, and the preload applied to the multi-plate clutch 17 is stabilized.

Further, the differential case 3 is formed with the engagement recess 33 and the release groove 35. To the engagement recess 33, the plurality of outer peripheral protrusions 31 formed on the outer clutch plate 13 in a circumferential direction are engaged. The release groove 35 faces, in the axial direction, the bearing rotatably supporting the differential case 3 with respect to a stationary system. The release groove 35 allows the bearing to be detached from the differential case 3. The engagement recess 33 communicates with the release groove 35.

Therefore, it is not necessary to provide a large number of wall thinning portions for the differential case 3, and the rigidity of the differential case 3 is maintained.

The second flange portion 39 is formed on the outer peripheral portion of the case main body 21 on the opening 19 side with the flange portion 23 of the cover body 25 serving as the first flange portion 37. Further, the second flange portion 39 abuts against the first flange portion 37 in the axial direction and is integrally fixed to the first flange portion 37. At least a part of the second flange portion 39 in the axial direction overlaps with the gear portion 27 and the multi-plate clutch 17 in the radial direction.

Therefore, it is possible to prevent the overhanging of the second flange portion 39 in the axial direction, and it is possible to prevent an increase in the size of the differential apparatus 1 in the axial direction.

Second Embodiment

A second embodiment will be described with reference to FIG. 8.

In a differential apparatus 101 according to the second embodiment, the outer clutch plates 13 are engaged with the case main body 21 so as to be integrally rotatable with the case main body 21.

The same components as those according to the first embodiment are denoted by the same reference numerals, configurations and functions of the same components refer to those according to the first embodiment and are omitted in description. The same effects as those according to the first embodiment are attained.

Figure 8:
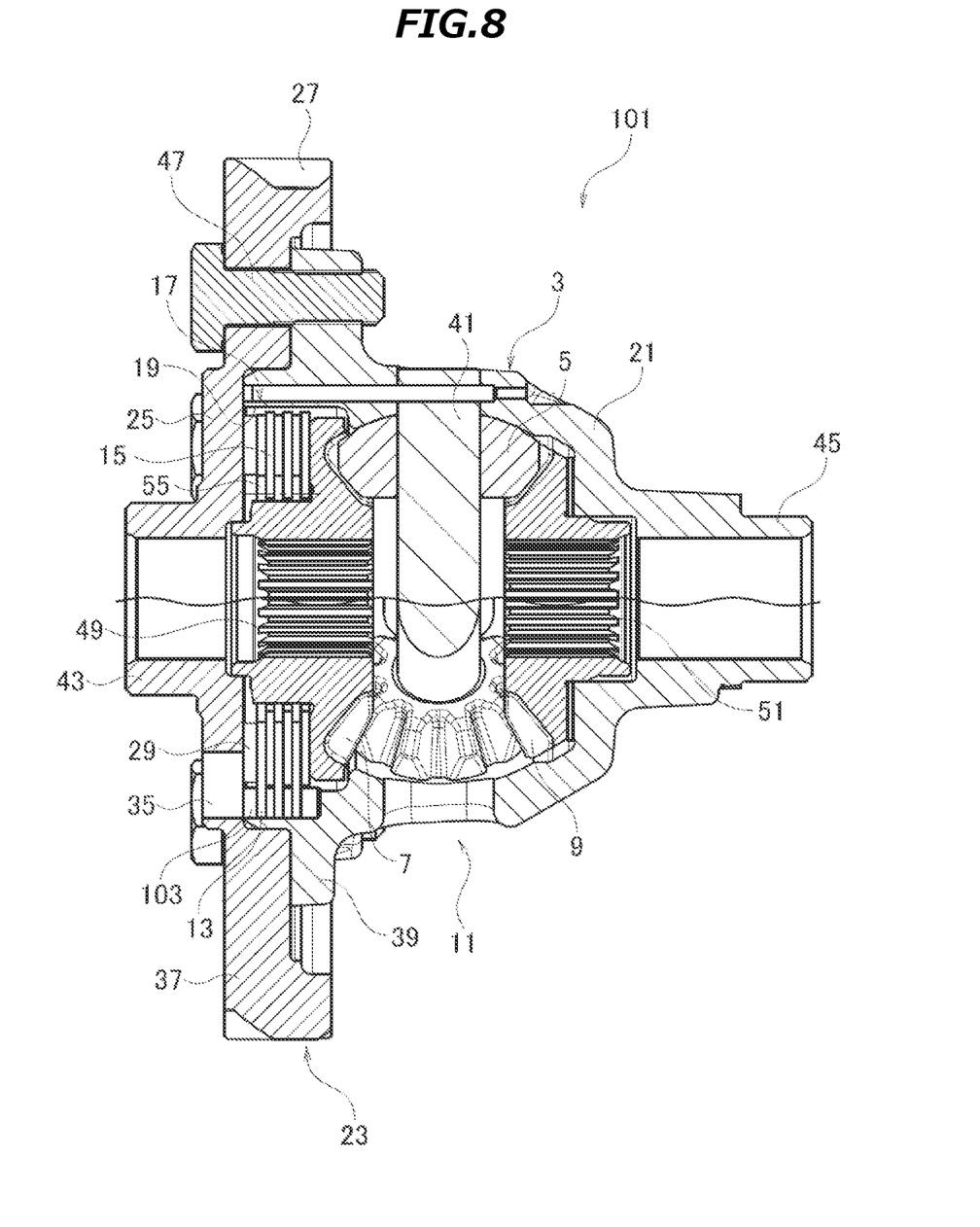
FIG. 8 is a cross-sectional view showing a differential apparatus according to a second embodiment.

As shown in FIG. 8, in the outer clutch plates 13 of the multi-plate clutch 17 provided on the opening 19 side of the case main body 21, the plurality of outer peripheral protrusions 31 (see FIG. 6) are engaged with a plurality of (in the present example, four) engagement recesses 103 formed on an inner periphery of the case main body 21.

The plurality of engagement recesses 103 are formed along the axial direction from the opening 19 side toward an inner side with respect to an inner periphery on the opening 19 side of the case main body 21, and are formed at equal intervals in the circumferential direction.

By forming the engagement recesses 103 in the case main body 21 in this way, it is not necessary to form a portion where the outer clutch plate 13 of the multi-plate clutch 17 is engaged with the cover body 25, and a structure of the cover body 25 is simplified.

In addition, because the engagement recesses 103 are formed only on the opening 19 side of the case main body 21, the engagement recesses 103 can be easily formed from the opening 19 without using a special tool, and the manufacturing cost can be reduced.

At least a part of the engagement recess 103 in the axial direction overlaps with the flange portion 23, the gear portion 27, and the multi-plate clutch 17 in the radial direction, and an increase in the size of the differential apparatus 101 in the axial direction is prevented.

In a state in which the case main body 21 and the cover body 25 are assembled to each other, the engagement recesses 103 coincide with the release grooves 35 in the circumferential direction of the differential case 3, and communicate with the release grooves 35.

In the differential apparatus 101, the outer clutch plate 13 is engaged with the case main body 21 so as to be integrally rotatable with the case main body 21. Therefore, it is not necessary to form a portion where the outer clutch plate 13 is engaged with the cover body 25, and the structure of the cover body 25 is simplified.

In the differential apparatus according to the embodiments, the engagement recesses and the release grooves communicate with each other. However, the present invention is not limited thereto, and the engagement recesses and the release grooves may be formed independently.

In accordance with the differential apparatus of the embodiments, the multi-plate clutch is provided only on an opening side. The outer clutch plates are engaged with the differential case so as to be integrally rotatable with the differential case, and the inner clutch plates are engaged with one of the pair of output gears so as to be integrally rotatable with the one of the pair of the output gears.

Therefore, because the multi-plate clutch is provided only on the opening side of the case main body, the number of components is reduced. Because the multi-plate clutch is not provided on the back side of the case main body, it would not be necessary to perform processing using a special tool, and the manufacturing cost is reduced.

Therefore, in the differential apparatus of the embodiments, the number of components is reduced, and the cost is reduced.

What is claimed is:

1. A differential apparatus, comprising:
   a differential unit including a differential case, a differential gear and a pair of output gears; and
   a multi-plate clutch including a plurality of outer clutch plates and a plurality of inner clutch plates, and configured to limit differential movement of the differential unit;
   wherein the plurality of outer clutch plates and the plurality of inner clutch plates are movable in an axial direction;
   wherein the differential case is rotatably provided and configured to receive a driving force;
   wherein the differential gear is supported on the differential case so as to be rotatable on an axis of the differential gear and is rotatable on an axis of the differential case;
   wherein the pair of output gears are rotatable relative to each other;
   wherein the pair of output gears respectively mesh with the differential gear and are respectively arranged to output the driving force;
   wherein the differential case includes a case main body and a cover body formed to close an opening of the case main body;
   wherein the opening of the case main body is formed on a side of one of the pair of output gears;
   wherein the cover body includes a flange portion that is arranged to receive the driving force input to the differential case through the flange portion;
   wherein the multi-plate clutch is provided exclusively on a side of the opening of the case main body;
   wherein the outer clutch plates are engaged with the differential case so that the outer clutch plates are integrally rotatable with the differential case;
   wherein the inner clutch plates are engaged with the one of the pair of the output gears so that the inner clutch plates are integrally rotatable with the one of the pair of the output gears;
   wherein the outer clutch plates are meshingly engaged with the cover body so as to be integrally rotatable with the cover body;
   wherein a gear portion is integrally formed on the flange portion so that the flange portion is arranged to receive input of the driving force to the differential case from the gear portion;
   wherein the multi-plate clutch is provided on an inner diameter side of the gear portion; and
   wherein at least a part of the multi-plate clutch in the axial direction and at least a part of the gear portion overlap with each other in a radial direction.

2. The differential apparatus according to claim 1, wherein the outer clutch plates are engaged with the case main body so as to be integrally rotatable with the case main body.

3. The differential apparatus according to claim 1, wherein at least the part of the multi-plate clutch or another part of the multi-plate clutch in the axial direction and at least a part of the flange portion in the axial direction overlap with each other in the radial direction.

4. The differential apparatus according to claim 1, wherein a biasing member that applies a preload to the multi-plate clutch is provided between the differential case and the multi-plate clutch in the axial direction; and
   wherein the one of the pair of the output gears receives a pressing force of the biasing member to the multi-plate clutch.

5. The differential apparatus according to claim 1, wherein the differential case is formed with an engagement recess and a release groove;
   wherein a plurality of outer peripheral protrusions are formed on the outer clutch plates and arranged in a circumferential direction of the outer clutch plates;
   wherein the plurality of outer peripheral protrusions are engaged with the engagement recess;
   wherein the differential case is supported with respect to a stationary system through a bearing;
   wherein the release groove faces the bearing in the axial direction, and the bearing is detachable from the differential case through the release groove; and wherein the engagement recess is connected to the release groove.

6. The differential apparatus according to claim 1, wherein a second flange portion is formed on an outer peripheral portion of the case main body on the side of the opening with the flange portion of the cover body serving as a first flange portion;
- wherein the second flange portion abuts against the first flange portion in the axial direction, and the second flange portion is integrally fixed to the first flange portion; and
- wherein at least a part of the second flange portion in the axial direction overlaps with the gear portion and the multi-plate clutch in the radial direction.

\* \* \* \* \*